Aug. 25, 1964  J. L. DESVIGNES ETAL  3,145,807
DISC BRAKES

Original Filed April 7, 1958  3 Sheets-Sheet 1

INVENTORS
JEAN LUCIEN DESVIGNES
PIERRE GANCEL
BY
John A. Young
ATTORNEY

INVENTORS
JEAN LUCIEN DESVIGNES
PIERRE GANCEL
BY John A. Young
ATTORNEY

Aug. 25, 1964     J. L. DESVIGNES ETAL     3,145,807
DISC BRAKES

Original Filed April 7, 1958     3 Sheets-Sheet 3

INVENTORS
JEAN LUCIEN DESVIGNES
PIERRE GANCEL
BY

ATTORNEY

United States Patent Office 3,145,807
Patented Aug. 25, 1964

3,145,807
DISC BRAKES
Jean Lucien Desvignes and Pierre Gancel, Paris, France, assignors to The Bendix Corporation, a corporation of Delaware
Continuation of abandoned application Ser. No. 726,885, Apr. 7, 1958. This application Oct. 17, 1962, Ser. No. 233,176
Claims priority, application France Apr. 17, 1957
14 Claims. (Cl. 188—73)

This application is a continuation of our copending application Serial No. 726,885 filed April 7, 1958 (common assignee), now abandoned.

The invention relates to brakes and more particularly to disc brake units of the type in which axially movable friction members are urged into engagement with opposite faces of an axially fixed disc by substantially equal forces developed by an applying mechanism located in a housing which straddles a portion of the periphery of the disc.

In a preferred (but in no way exclusive) embodiment of the invention, the applying mechanism includes opposed fluid pressure cylinders and pistons in a stationary housing. In providing such a brake unit, there are several manufacturing and field service problems: the intricate shape of the unit rules out the possibility of manufacturing its components by a stamping process; as the housing straddles the caliper tends to prevent removal of the friction elements without a complete dismantling of the unit. For overcoming the above disadvantages, we propose to construct the brake unit according to the invention by building it up from separable portions, each of which being manufactured by the most favorable method: casting or stamping. As to the easy replaceability of each friction member, it is insured by the provision of an appropriate opening in a reinforcing plate which straddles the disc.

The applying device often includes, and should always be designed so as to be capable of being fitted with two independent applying mechanisms, one of which is mechanically actuated while the other is generally fluid-pressure actuated. Particularly on passenger cars, two independent controls (hydraulic and mechanical) should be provided on the rear wheel brakes while the front wheel brakes have only a hydraulic control.

One important object of the invention resides in a new and improved arrangement of the components of a brake unit including two independent applying mechanisms, one of which at least is mechanically actuated, in which the mechanism cooperates for guiding the friction member and receiving the anchoring thrust thereof.

Another object of the invention resides in a new arrangement of the parts which enables to use substantially the same parts for the front and the rear brakes, the only difference being the adjunction of a mechanical actuation for the rear brakes.

A further but optional object of the invention is to provide a brake unit, the housing of which includes two castings, in which fluid pressure cylinder bores are machined, and stamped parts which interconnect the castings and insure the rigidity of the housing.

Yet another object of the invention resides in an arrangement of the friction elements such as to transmit the peripheral thrust exerted by the disc on the friction members to the housing without it being transmitted through the actuating means which operates the applying mechanism. The actuating means may be either mechanical or hydraulic and in either instance the torque load from braking operation is not transmitted to said actuating means.

The above and other features of the invention will appear more fully from the following description which proceeds with reference to the annexed drawings, wherein an embodiment of the invention is illustrated by way of example, and should not be considered as limitative in any way. In the drawings.

Figure 1:
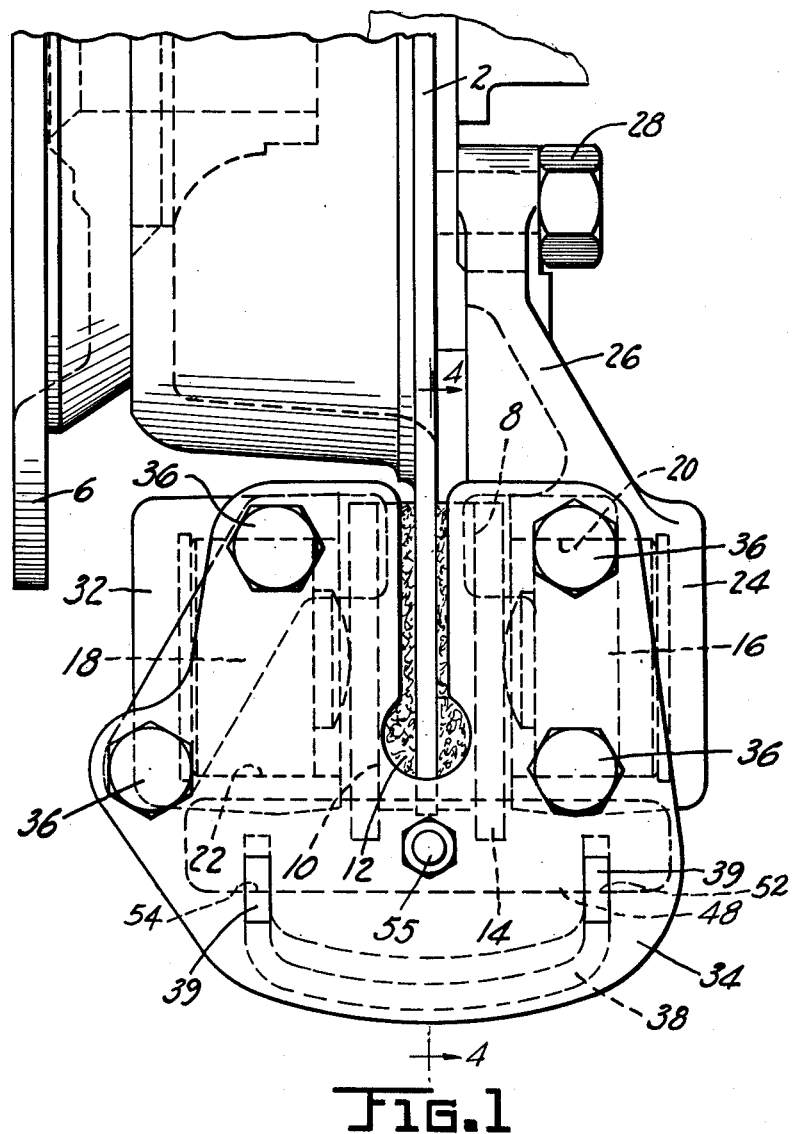
FIGURE 1 is a side elevation of a disc brake for a front wheel, constructed according to a part of the teachings of the invention, but which does not include a mechanical applying device.

Referring to the drawings, the brake comprises a disc 2 secured to a rotating part of the vehicle, such as for instance a wheel rim, and one or a plurality of brake units, one of which only is shown. Each brake unit includes a stationary housing which will be described thereafter, and a pair of friction members 8 and 10. Each friction member consists of a pad of friction material lining 12 bonded or riveted to a backing member 14.

The friction members 8 and 10 are urged against the disc by pistons 16 and 18 respectively, reciprocably received in coaxial blind bores 20 and 22 of the housing. The friction members have a universal connection or even an abutting connection (FIGURE 1) with the pistons as separate guiding devices are provided for taking the anchoring thrust of the friction members.

Bore 20 is machined in a main cylinder casting 24 which has a solid part and an arcuate end part of substantially lesser thickness which is provided with plane faces secured through its integral portion 26 against an adjacent stationary part of the vehicle, such as an axle housing, not shown, by bolts 28.

The other blind bore 22 is machined in a second cylinder casting 32 which has a solid portion of substantial thickness, similar to that of casting 24, but has no end portion.

Although parts 24 and 32 have been referred to as "castings," they can of course be forged, if a higher strength is needed. In the following description, the word "casting" alone will be used, but it should be understood that it should include other equivalent structures such as forgings and hence the word "casting" is used in a non-exclusive sense.

The cylinder castings are interconnected by yoke members 34 which are secured to the plane lateral faces of the castings by machine screws 36. Yoke members 34 are connected by a curved metal plate 38, welded on them at points 39, which can be formed with crimped portions for insuring its rigidity.

It is to be noted that the pistons exert axial forces only on the friction members. An insulating member can be interposed between each of pistons 16, 18 and the respective friction members so as to prevent heat from being transmitted to the piston and to the hydraulic fluid in the cylinder. This improvement is possible because axial forces only have to be exerted by the actuating means, the tangential or anchoring load being taken separately from the actuating means.

Figure 2:
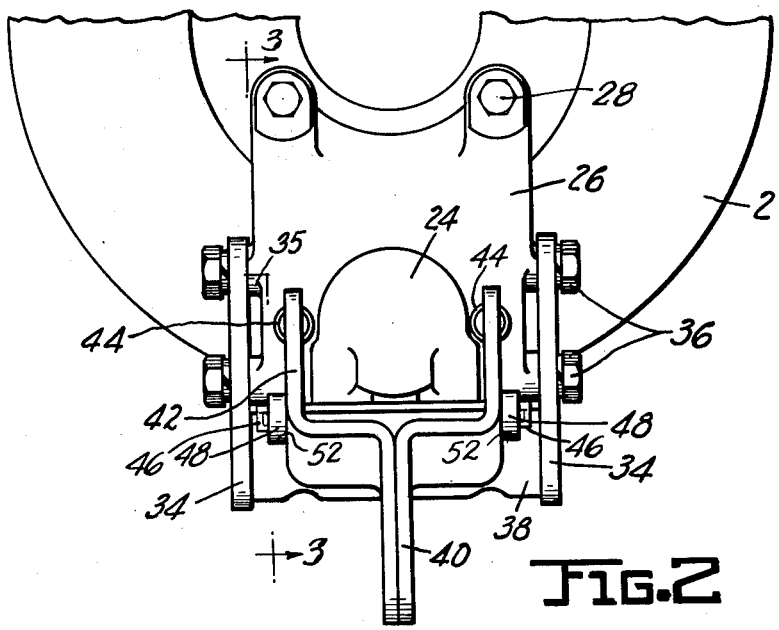
FIGURE 2 is an end view of a brake similar to that shown on FIGURE 1, but comprising a mechanical applying device according to the invention.
Figure 3:
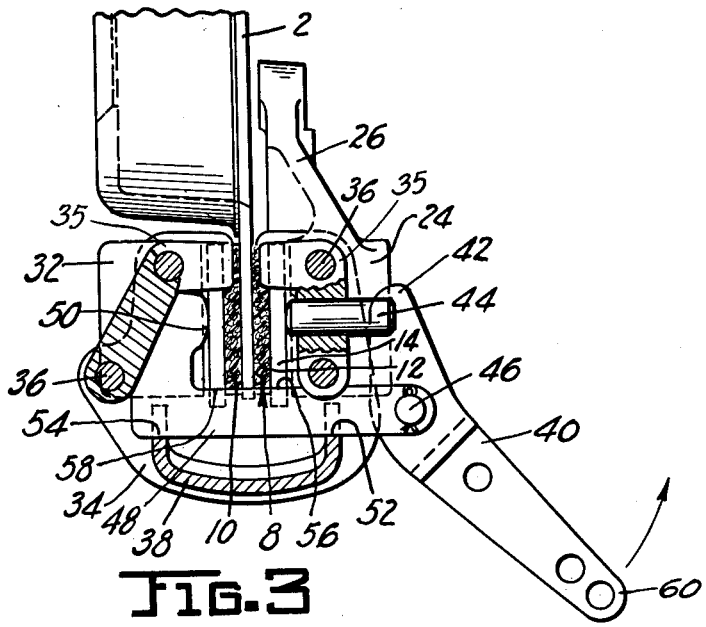
FIGURE 3 is a sectional view of the brake of the FIGURE 2, taken on line 3—3 of FIGURE 2. On this figure one of the cylinders is broken away to show one of the push rods which mechanically apply the brake.
Figure 4:
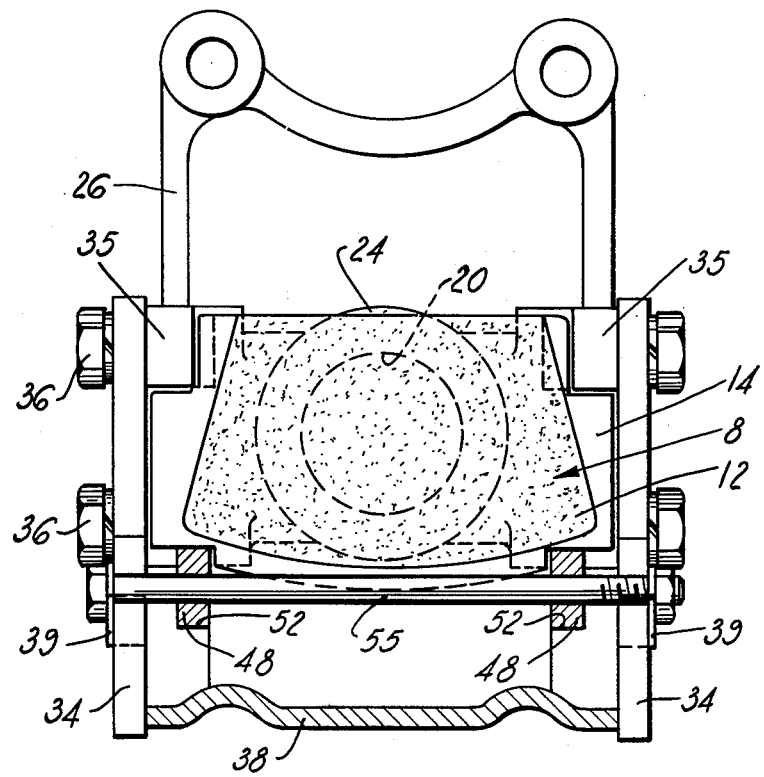
FIGURE 4 is a section view taken on line 4—4 of FIGURE 1.

The brake unit of FIGURES 2–3 comprises a mechanically controlled applying mechanism, which is wholly independent of the hydraulically controlled mechanism and can be alternatively used, for instance for braking the parked vehicle.

Referring now to FIGURES 2 and 3, the mechanically actuated applying device comprises a manually-actuated forked lever 40 having two parallel arms 42 whose respective ends abut against two push rods 44 adapted to urge friction member 8 associated with the main cylinder casting against the disc. Arms 42 are pivotally connected by means of pivot pins 46 to axial links 48 having arcuate left end portions 50 which abut the other friction member 10 and are adapted to urge it against the disc. Links 48 are preferably formed by stamping while forked lever 40 comprises two stampings having offset legs clamped together (FIGURE 2). Each pivot pin 46 which connects an arm 42 to the corresponding links is received in mating openings of the arm and the link, the opening in the lever arm being cut in such a place as to determine a proper mechanical advantage of the lever. Each link 48 is received and guided in two aligned openings 52 and 54 formed in the arcuate reinforcing plate 38 and cooperating for axially guiding the link 48 during its reciprocation. Each is equally received in slots 56 and 58, respectively cut in the backing member of friction members 8 and in the backing member of friction member 10. This arrangement of the links provides a sliding connection between friction members 8, 10 and reinforcing plate, whereby the friction members are axially guided and are prevented from pivoting about an axis parallel to that of the cylinder under the action of the peripheral shifting forces exerted by the disc on the lining pads. Further, the links 48 transmit the thrust exerted by the disc on the friction members to reinforcing plate 38, and to the housing. In this manner, the braking force is taken by links 48 independently of the actuating means constituted by the applying lever 40.

The links 48 preferably cooperate for axially guiding the friction members with a sliding contact of the lateral edges of the friction members against the inner faces of the yoke members 34 and against offset portions 35 of the solid part of the cylinder castings. The peripheral shifting forces exerted on the friction members by the rotating disc upon application of the brake is thereby taken by the abutment of the friction members at their ends against one or the other of the yoke members, according to the direction of rotation of the disc. But it should be noted that, even if the edges of the longitudinal slot of the yoke members 34 extend closely to the disc, the guiding of the friction members is not completely insured when the lining pads are worn out: this disadvantage is avoided by the use of links 48 for guiding the pads.

An apparent disadvantage of the use of the mechanical applying mechanism for guiding the friction members resides in that the front brakes (on a rear wheel driven vehicle) do not include such a mechanical applying device. FIGURE 1 shows that in our embodiment the omission of the mbechanical control (parking control) does not result in any change in the basic brake design. The links 48 only have a different shape and are secured to the housing by screws 55 in place of being reciprocable.

The particular embodiment shown on the annexed drawing does not include return springs. Return springs are useless due to a particular design of the friction members which has been described and claimed in U.S. Patent No. 3,035,664, filed on August 28, 1957, in the name of the same applicants: in that application there is disclosed a friction member design in which the supporting pad is slightly resilient so that the lining wears in a hollow shape under the action of the main actuating mechanism of the brake which applies a force at the center of the pad; upon release of that control the supporting pad returns to its original shape and the lining remains in contact against the disc by its outer edges only. Nevertheless the brake which has been described above can of course be provided with return springs of any type well known in the art.

The brake operation is as follows: in their normal position, the friction members bear against the disc by their outer edges only. When the communicating bores 20 and 22 receive fluid under pressure from a master cylinder or a servo motor, not shown, both pistons are urged towards each other with the same force and apply friction members 8 and 10 against the opposite faces of the disk. The disc exerts on the friction members tangential thrusts which tend to shift them in a peripheral sense, but this thrust is transmitted by links 48 to the plate 38 and, in certain designs, to either yoke member 34 or to the cylinder castings 24, 32.

As the housing covers a small angular portion of the disc surface, intensive heat dissipation by convection and radiation takes place, whereby "fading" is prevented from occurring and the brake efficiency remains constant, whatever be the duration of the application.

As soon as the fluid pressure acting against the hydraulic pistons 16 and 18 is released, the friction members 8, 10 take support on their outer edges and resiliently bring back the pistons against the friction of the guiding means which maintain the friction members during their resilient deformations.

Optionally, an opening can be cut in reinforcing plate 38 for enabling an easy replacement of the friction members without any dismantling when the linings are worn out. Such an opening also enables to visually check the wear of the linings. This opening (not shown on the figures) is preferably provided in front of the disc with a width slightly greater than the original thickness of the friction members, so that the rigidity of the assembly is not lessened too much; all that is required for replacing the friction pads is a ready removal of the pins 46 and links 48.

The operation of the mechanical control (parking brake) is very similar: a driver's operated cable (not shown) is connected to the lower end 60 of the forked lever 40. When the cable is manually pulled, lever 40 is pivoted counterclockwise, in the direction of the arrow on FIGURE 3 and two opposed forces are developed: one force is transmitted by the end portion of arms 42 to push rods 44, the other force is developed at pins 46 and is transmitted through links 48, and link ends 50 to friction member 10. Due to the high mechanical advantage of lever 40, the forces exerted on the push rod and on the links 48 are substantially the same. Friction member 8 is urged by the push rods 44 against one of the disc faces, while friction member 10 is applied against the other face with a substantially equal force by the links 48.

It is important to note that when the brake is operated by either actuating mechanism, all the parts of the other mechanism remain unmoved, whereby the friction forces and the manually applied force have a minimum value.

The brake which has been described above and which has been shown in the annexed drawings is not intended to limit the scope of the invention. It should be understood that any modifications or applications of the described embodiment which are within the skill of the man of the art or not depart from the spirit of the invention should be considered as being within the scope of the following claims.

We claim:

1. A disc brake assembly for a vehicle, including a rotatable brake disc fixed against axial movement, annular flat friction surfaces on opposite faces of said disc, a pair of separately movable segmental friction members covering an angular portion only of said friction surfaces, a first cylinder housing secured to a stationary part of the vehicle, a second cylinder housing, a pair of C-shaped yoke members straddling said disc to interconnect the corresponding lateral faces of said housings, the arms of said yoke members extending closely to said disc to provide anchoring surfaces engageable by the ends of said friction members, a reinforcing plate having connections with said yoke members, axial links received in aligned openings of said friction members and reinforcing plate for guiding said friction members, said axial links being mounted for slidable movement biasing said segmental friction members against the flat friction surfaces on the opposite faces of said disc, communicating hydraulic cylinders in said first and second housings, and coaxial pistons reciprocably received in said hydraulic cylinders for urging said friction members against the opposite faces of said disc.

2. A disc brake as set forth in claim 1 wherein said links cooperate for guiding said friction members with a sliding engagement of the ends of said friction members against said yoke members.

3. A disc brake assembly for a vehicle, including a rotatable disc having annular friction surfaces, a pair of friction members adapted to be axially applied against said friction surfaces, and a housing straddling an angular portion of a periphery of the disc, said housing comprising a main housing secured to a stationary part of the vehicle and extending closely to a friction surface of said disc, a second housing extending closely to the other friction surface of said disc, a pair of C-shaped members straddling said disc and interconnecting said housings and an arcuate reinforcing plate connecting said C-shaped members, means for mounting said friction members for individual free slidable movement on each side of said rotatable disc, said friction members being proportioned to abut at the opposite ends thereof with a respective one of said C-shaped members which provides anchoring surfaces therefor, said housings having communicating fluid pressure motor means reciprocably locating fluid pressure actuated members adapted to urge said friction members toward said disc.

4. A disc brake assembly as set forth in claim 3, wherein said reinforcing plate is open over a sufficient length to permit the visual checking and the replacement of said friction members.

5. A disc brake assembly including a rotatable disc having two annular friction surfaces, a pair of friction members adapted to be axially urged against said friction surfaces and a housing covering an angular portion of the disc, said housing comprising a main cylinder housing secured to a stationary part and facing one friction surface, a second cylinder housing facing the other friction surface, a pair of C-shaped members straddling said disc and interconnecting said housings and an arcuate reinforcing plate having reinforcing ribs and connecting said C-shaped members, said friction members being proportioned to fit between the ends of said C-shaped members with said ends being in slidable anchoring engagement therewith for individual free sliding movement toward and away from the associated annular friction surfaces of said disc, fluid pressure motor means located in said housings for actuating said friction members, and axial links received in aligned openings of said friction members and reinforcing plate for axially guiding said friction members.

6. A disc brake assembly comprising a rotatable disc having annular friction surfaces, a pair of friction members adapted to be axially urged against said friction surfaces, a stationary housing covering an angular portion of said disc, said housing comprising a pair of cylinder housings interconnected by yoke members straddling the disc, a pair of coaxial communicating cylinder bores machined in said housings, said friction members being disposed between said cylinder housings and the oppositely facing friction surfaces of said disc and proportioned so that the ends thereof bear against one or the other of said yoke members to communicate anchoring load thereto upon engagement with their respective friction surfaces, a pair of hydraulically actuated pistons in said bores for applying said friction members, means for axially guiding said friction members, said means comprising a pair of axial links slidably received in slots of said friction members and fastened in openings of said stationary housing.

7. A disc brake assembly for a vehicle including a rotatable disc having annular friction surfaces, a pair of friction members, means for applying said friction members against said friction surfaces with substantially the same force, and a stationary housing covering an annular portion of the disc, said housing having a main housing secured to a stationary part of the vehicle and facing one side of the disc, another housing facing the other side of the disc, a pair of C-shaped members straddling a periphery of said disc and interconnecting the lateral ends of said housings, said friction members being proportioned to fit between said C-shaped members with the ends thereof in slidable anchoring engagement with said C-shaped members, an arcuate reinforcing plate for connecting said C-shaped members, and axially disposed links secured in openings of said plate and reciprocably received in slots of said friction members, said links cooperating with said C-shaped members to provide guiding of said friction members which are independently movable toward and away from said friction surfaces.

8. A disc brake assembly comprising a rotatable disc, a housing straddling a portion only of a periphery of said disc, a pair of axially movable friction members disposed one on each side of said rotatable disc and between the straddling portion of said housing and the opposed rotor surface, said friction members being adapted to axially squeeze said disc and transmit to said housing the anchoring face of said friction members, an applying device comprising links having a force transmitting connection with one friction member and adapted to transmit an axial force to said one friction member, said links being received in aligned openings of said friction members and housing, and lever means having a force transmitting connection with the other of said friction members and said links and thereby adapted to exert an applying force on said links and on the other of said friction members.

9. In a disc brake assembly comprising a rotatable disc fixed against axial movement, a housing straddling an angular portion of said disc, a pair of axially movable friction members disposed within said housing and adapted to be urged against opposed faces of said disc, anchoring means provided by said housing having slidable engagement with said friction members, an axially-floatable mechanical applying device having axial links slidably received in aligned openings of said friction members and housing, each link having an end adapted to transmit an applying force to one of said members through an abutting connection, each link having its other end connected to an intermediate point of a manually operated actuating lever, said lever being adapted to transmit an applying thrust to the other of said friction members through an abutting connection and to said link upon rotation of said lever.

10. In a disc brake assembly as set forth in claim 9, hydraulically actuated means located within said housing and having thrust connections with said respective friction members for applying said friction members against said rotatable disc and independently of said mechanical applying device.

11. A disc brake assembly including a rotatable disc having annular friction surfaces, a pair of friction members axially movable against said friction surfaces, and a housing straddling an annular portion of the outer periphery of said disc, said housing comprising first and second housings each facing one friction surface of said disc, at least one of said housings being secured to a stationary member, a pair of C-shaped members straddling said periphery and interconnecting said housings, the legs of said C-shaped members closely embracing said disc, means for mounting said friction members for individual free sliding movement on each side of said rotatable disc, said friction members being proportioned to abut at their opposite ends with the respective ones of said C-shaped members which provide anchoring surfaces therefor, means for connecting said C-shaped members and housings and having an opening for radial insertion and removal of said friction members, and communicating hydraulic cylinders formed within said housings and including reciprocably mounted pistons adapted to urge said friction members toward said disc.

12. In a disc brake assembly comprising a rotatable disc fixed against axial movement, a stationary housing straddling a portion only of a periphery of said disc, a pair of friction members axially movable in said housing and adapted to be oppositely applied against said disc, means forming anchoring abutments on said housing and slidably engaged by the ends of said friction members to receive anchoring force thereof, means for applying force to said friction members including at least one axial link connected to one of said friction members to transmit an axial applying force to said one of the friction members, said link being slidably received in aligned openings of said friction members and the housing and cooperating for axially guiding said friction member, and means for applying force to said axial link.

13. In a disc brake assembly comprising a rotatable disc having friction surfaces thereon, a stationary housing straddling said disc, a pair of friction members movable in said housing toward and away from said friction surfaces and adapted to be oppositely applied against said friction surfaces, means forming anchoring abutments on said housing and slidably engaged by the ends of said friction members to receive anchoring force thereof, means for applying force to said friction members including at least one link extending transversely to said friction surfaces and connected to one of said friction members to transmit an applying force to said one of the friction members, said link being slidably received in aligned openings of said friction members and the housing and cooperating for guiding said friction member, and means for applying force to said link.

14. The structure as recited in claim 13 wherein there are a plurality of links.

References Cited in the file of this patent

UNITED STATES PATENTS 2,820,530　Chouings et al. _____ Jan. 21, 1958

FOREIGN PATENTS 1,105,308　France _____ Nov. 29, 1955

UNITED STATES PATENT OFFICE
CERTIFICATE OF CORRECTION

Patent No. 3,145,807                          August 25, 1964

Jean Lucien Desvignes et al.

It is hereby certified that error appears in the above numbered patent requiring correction and that the said Letters Patent should read as corrected below.

Column 3, line 54, for "mbechanical" read -- mechanical --; column 6, line 26, after "comprising" insert -- axial --.

Signed and sealed this 2nd day of March 1965.

(SEAL)
Attest:

ERNEST W. SWIDER                       EDWARD J. BRENNER
Attesting Officer                         Commissioner of Patents